Dec. 24, 1968    G. F. H. VON STROH    3,418,108
EXTERNALLY FIRED CUPOLA FURNACE AND METHOD OF OPERATION THEREOF
Filed Dec. 17, 1965    3 Sheets-Sheet 1
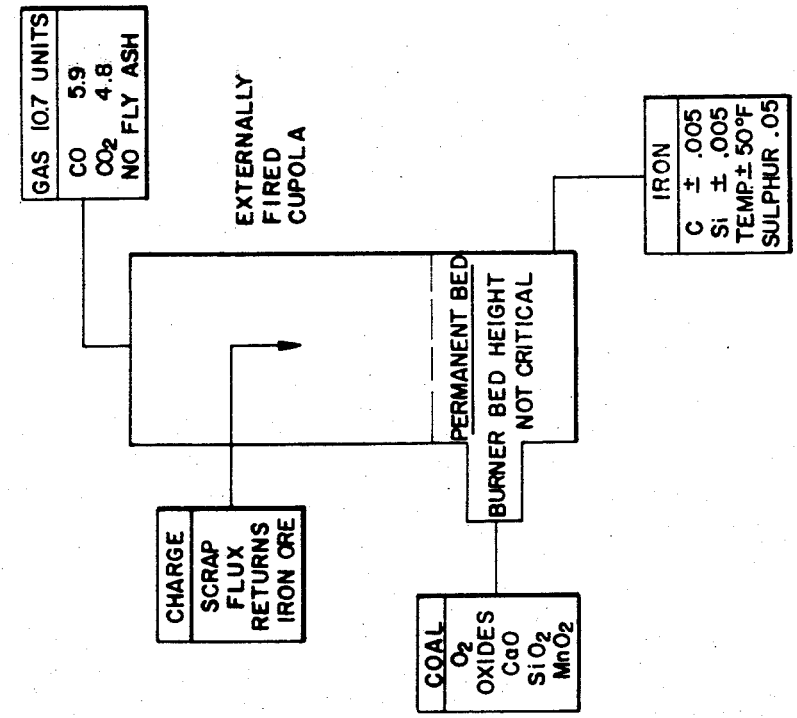
FIG. 2.
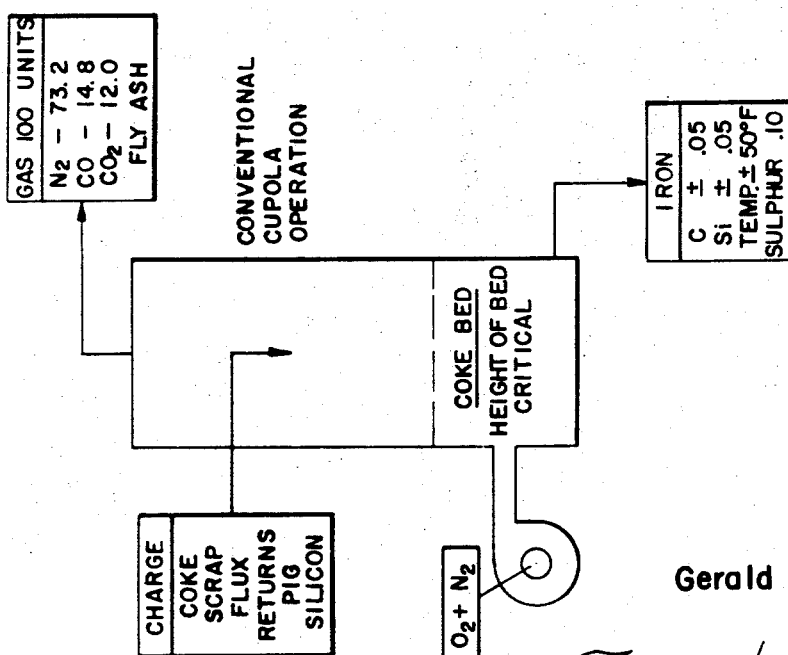
FIG. I.
INVENTOR
Gerald F. A. Von Stroh
BY Thomas, Weidman & Russell
ATTORNEYS INVENTOR
Gerald F. A. Von Stroh

United States Patent Office 3,418,108
Patented Dec. 24, 1968

---

3,418,108
EXTERNALLY FIRED CUPOLA FURNACE AND METHOD OF OPERATION THEREOF
Gerald F. H. Von Stroh, Huntington, W. Va., assignor to Industrial Science Corporation, Cleveland, Ohio, a corporation of West Virginia
Filed Dec. 17, 1965, Ser. No. 514,625
10 Claims. (Cl. 75—43)

ABSTRACT OF THE DISCLOSURE

An apparatus and method for reforming metal in a cupola-type furnace wherein the burner thereof is located exteriorly of the furnace column, the charge is supported upon a fixed, perforate bed above the combustion zone, and particulated reforming metal oxides, such as lime, along with particulated combustible substances, such as coal, are fed in a combustion supporting medium, such as oxygen enriched air, to the burner where the mixture is combusted and then fed to the cupola below the top of the perforate bed.

---

This invention relates to an improved cupola furnace, as well as an improved method of operation thereof, adapted to the smelting, melting and refining of metals, as well as glass, enamel and the like, and is more particularly directed to a cupola-type of structure which is externally fired in the sense that combustion for the purposes of obtaining the relatively high temperatures and gas compositions which are necessary in operations of this type takes place exteriorly of the furnace. In such an operation the combustion gases, which attain temperatures of over 4500° F. are fed directly into the lower well of the furnace and effectively diffused through the bed and charge placed therein.

As well appreciated by those skilled in the art, although both are shaft furnaces and rely upon the coke bed type of operation, the basic differences between the conventional cupola and blast furnace procedures reside in large part in the different purposes or objectives of these two types of furnaces. In the blast furnace the objective is one primarily of smelting or reduction to produce pig iron—the primary product obtained by the reduction of iron ore. Briefly, in the latter type of operation the carbon dioxide resulting from the combustion of coke within the furnace is reduced to carbon monoxide and the latter reduces the iron oxide of the ore comprising the charge to the furnace, to metal. The metal is separated from the resulting slag and poured into pig molds, the resulting pigs being a basic material used in foundry practices and other metallurgical procedures.

In the conventional cupola the basic purposes differ substantially from that just described. Here the objective is not one primarily of ore reduction, or even in many cases of refinement, but merely the production or reformation of metal to metal of more precise and desired characteristics for use in a given sphere of industry. Thus, in the conventional cupola operation, although socalled "returns" and scrap metal may form a part of the charge, a primary component of this charge is the pig iron produced from blast furnace operations; the ultimate result of conventional practices in this regard thus being mere reformation of the metals charged to the cupola.

Hence, in that type of shaft furnace typified as the cupola, the objective is the remelting and refining or reforming of iron for a variety of products, as, for example, automotive engine blocks, gear cases, etc.; whereas the blast furnace is used for the production of iron, the latter generally not being suitable for castings until further modified to the extent desired in the cupola.

In operation of the conventional cupola (as with the blast furnace) a quantity of coke is charged to the furnace, ignited, and when the bed of coke has become fully ignited or reaches a predetermined stage of combustion, additional coke is added to provide the necessary bed height.

Following this, the metal to be melted and reformed (i.e., changing the nature of the iron alloy) is charged into the shaft aong with appropriate fluxes and alloying materials which may be required to produce the reformed material as dictated by the type of casting desired. In practice, additional coke is charged to the cupola to replace that burned and to provide heat for continued operation. This cycle of charging metal, flux and coke is repeated for whatever time is required to produce the desired amount of metal.

In this conventional operation of the cupola the bed of coke performs a number of significant functions. Obviously it constitutes the fuel necessary to reach the required melting and reforming temperatures. The coke bed also supports the weight of the material which is charged to the shaft and superheats the metal by surface contact therewith, the resultant molten metal resulting flowing by gravity to the bottom or well of the cupola wherein it is discharged. In addition, the coke bed diffuses the heat and gases across the cross section of the cupola, although not to the extent obtained in the use of the instant invention.

Although in conventional cupola operation the end objectives for which this furnace was originally designed are obtained, there are a number of limitations created by the very nature of the operation. For example, in conventional cupola practices the material to be melted must pass through a series of zones—a preheat zone, a reducing atmosphere, a zone of oxidizing atmosphere, a super heat zone, and finally to the well or storage area. It often happens that in the oxidizing phase or zone certain desirable elements, such as carbon and silicon, will be oxidized and thus lost, or unavailable as a component of the finished metal; even more significantly, in such operations it is impossible to eliminate variations in height of the coke bed as this bed is consumed during operation. Thus, the size of the oxidizing zone will vary and this necessarily will result in a variation of the ultimate characteristics of the product metal. Also bed height will have an effect on the temperature of the metal when poured.

In this same vein, since in the conventional cupola the size of the combustion and melting chamber is fixed, the rate of combustion and hence the rate of melting is correspondingly and relatively fixed both up and down. Again, operating a large cupola to produce a small amount of metal is not only difficult but expensive, and the metallurgy of the finished iron, as well as its pouring temperature, is often unsatisfactory, or at least far below the standards which have been determined as desirable.

Another inherent difficulty of present and past cupola systems is the rate of erosion of the refractory lining employed, resulting in repeated replacement thereof. This occurs consequent upon the high concentration of oxygen in the oxidizing zone. At any rate, cut out of the refractory at a point above the tuyeres for replacement purposes requires, in most operations, that the charge be dropped, and the cupola permitted to cool (this further deteriorates the refractory) in order that this portion of the lining can be repaired. Under conventional practices replacement or repair of the linings is necessary almost every day, or as in some instances, at least once a week.

The instant invention, by providing means for externally firing of the cupola, permits addition thereto of the necessary metallic components in oxide form to adjust the product metal to its desired alloy. Also, the ability of the present invention to smelt, refine or reduce native ore thus either eliminates or substantially reduces the need for pig iron as a part of the charge. Other factors present with respect to the externally fired cupola, and as set forth herein, overcome those limitations inherent in conventional cupola practices and as outlined in the foregoing. And the end result is to produce not only a better, but cheaper, product.

It is, accordingly, an object of my invention to provide a melting and refining furnace having a shaft of any shape, but preferably round, wherein the metal or substances to be melted, smelted or refined, are heated to the proper temperature by means of a burner disposed externally of said shaft, whereby the usual coke charge and the disadvantages which flow from the use thereof, are eliminated.

It is a further object of the invention to provide an externally fired cupola wherein native iron ore can be charged to the cupola as a component of the overall charge, in lieu of, or in addition to whatever amount of pig iron and other ferrous materials are desired as a part of the charge, this ore being smelted and refined during the course of melting of other metals in the charge so that a casting metal is produced in one complete and self contained step to the exclusion of products produced by blast furnace operations.

Another object of the invention is the provision of an externally fired furnace of the described type wherein, by that very factor of obtaining combustion externally to the shaft permits of complete control over the rate of combustion with consequent control over the ultimate temperature desired and melting rate.

An additional objective of the invention is the provision of a unit of the described type provided with a system whereby additional metals, in their oxide form, such as silicon, manganese, etc., can be fed directly to the external burner and proportioned in exact amounts so that the operation is further precisely controlled with respect to the obtaining of the alloy desired for casting or other purposes. In this regard essential nonmetals, as oxides of phosphorus, may also be added in like manner.

In addition the invention has the object, by so utilizing an externally fired cupola arrangement, of providing a melting zone of uniform permeability across the cross section of the cupola, such being unrestricted since not impeded by a coke bed that during the course of operation will vary in height, as above mentioned.

A further object of the invention is the provision of a cupola apparatus and a method of operation thereof which lends itself to simplification of the air pollution problem inherent in any cupola operation. In this regard, the use of oxygen rather than air becomes economically practical because of the low cost of fuel used in the externally fired burner, and, as will further be explained herein, the operation is conducive to substantial reduction or practical elimination of those products of combustion which are normally passed to the atmosphere, as excess carbon monoxide, carbon dioxide and fly ash.

Other advantages and objects of the invention will be apparent from the more detailed disclosure thereof which follows and having reference to the several figures depicting a preferred embodiment of the method and apparatus of the invention, and wherein:

FIGURE 1 is a graphic chart illustrating the basic operation of a conventional cupola;

FIGURE 2 is a graphic chart to be considered in the light of FIGURE 1 and indicating generally the underlying and fundamental differences between the externally fired cupola of my invention and the conventional type as per FIGURE 1;

Figure 3:
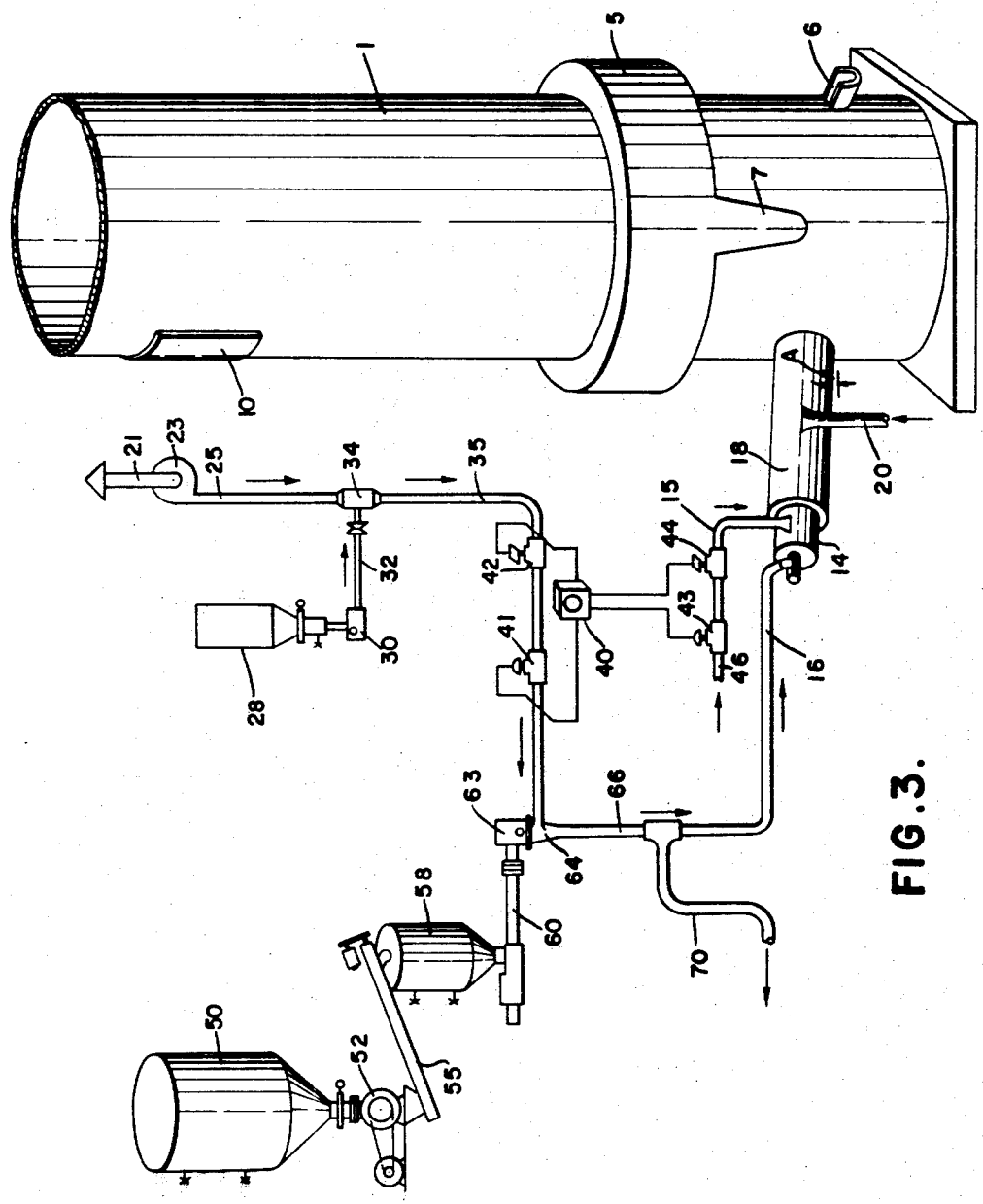
Figure 4:
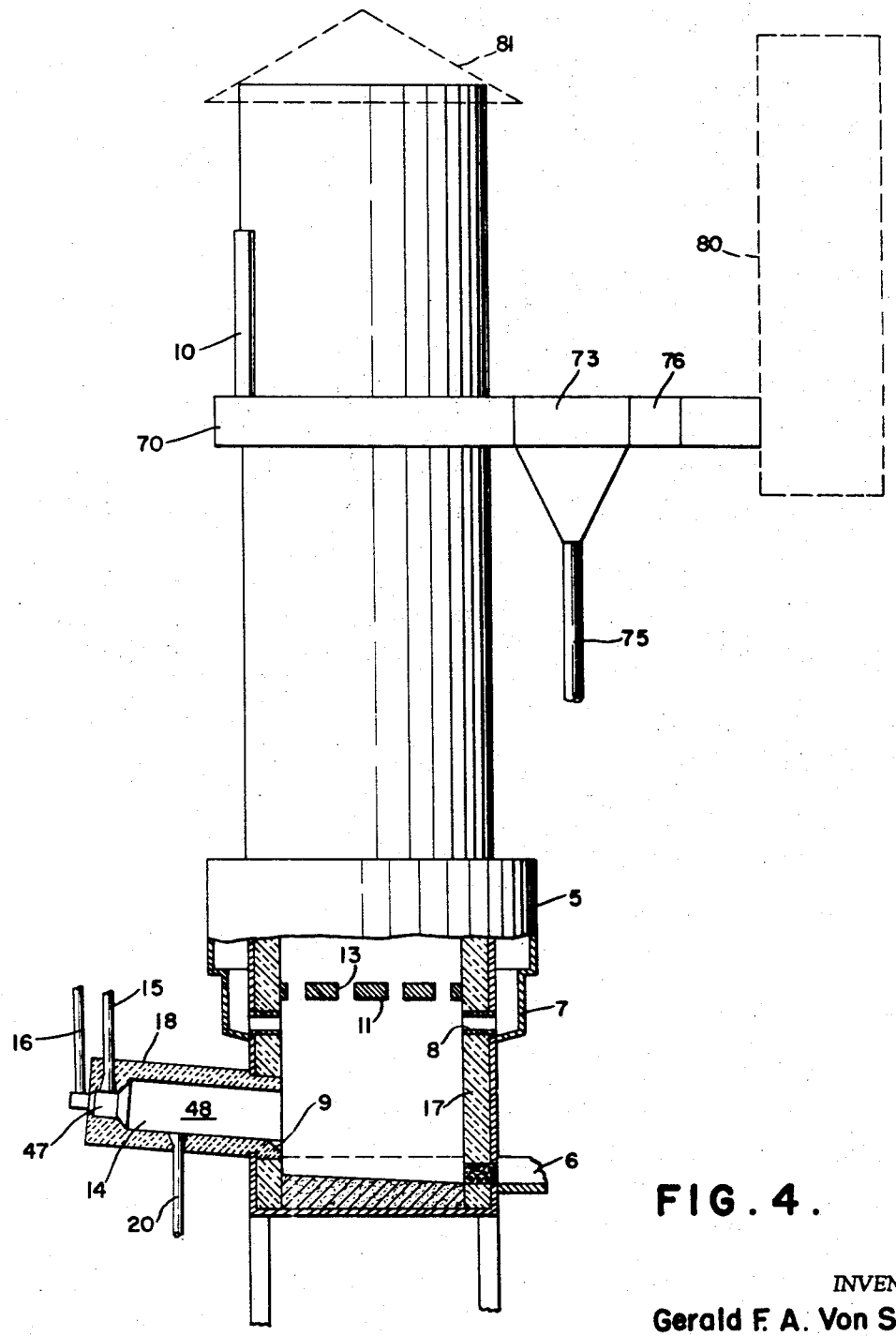

FIGURE 3 shows the general arrangement of the externally fired cupola of this invention, including the means for feeding air or oxygen, or both, into one of the burners for the cupola, such gas stream carrying with it metered amounts of various mineral bearing oxides, as well as a metered amount of fuel, here pulverized coal; and FIGURE 4 is an elevation view, partly in section, of the cupola of the invention, particularly illustrating the fixed feed adapted to support the charge and indicating also, somewhat diagrammatically, a suitable and simplified air pollution prevention means.

Referring to FIGURES 1 and 2, these, as stated, illustrate the disparate nature between the conventional cupola operation and the cupola of this invention.

In conventional practices, as indicated, not only does the coke bed itself support the charge but the height of that bed is critical, yet subject to variation in height. In known practices the charge over the coke consists of pig iron, scrap, returns, and perhaps silicon in the form of ferro silicon or silvery pig iron. Usually an air source is provided to support combustion and in this eventuality a considerable amount of nitrogen is discharged to the atmosphere, as indicated.

In contrast, and as exhibited in FIGURE 2, the externally fired cupola of this invention is designed to operate with a permanent or semipermanent bed made of suitable refractory material. In this instance such permanent or semipermanent bed needs to perform only the function of supporting the charge, diffusing the heat and gas throughout the melting zone, and superheating the metal comprising the charge. Because the bed is fixed, or at least fixed relative to the moveable characteristics inherent in the usual coke bed, its height is not particularly critical, as in the case of the latter.

FIGURE 2 indicates diagrammatically the external burner through which is fed oxygen or a combination of air and oxygen, pulverized coal (or other fuel) and the necessary metallic oxides desired for reduction or fixation of the alloy to be desired, such as calcium oxide, silicon oxide, manganese oxide, etc.

As shown in this Figure, the cupola of this invention contemplates an operation where the charge may include not only scrap and returns, as well as the usual flux, but iron ore itself—in which case the operation becomes one of smelting or reduction of the ore.

A comparison of the operating characteristics of the conventional cupola and this externally fired cupola also indicates a wide divergence in the effectiveness of control of conditions affecting the composition of the ultimate product (the casting alloy). As to the latter, and as an example, it is clear that the more accurate control of operation enabled by external firing results in finer adjustments of the metallic components in the final casting alloy; in the instance of this invention plus or minus 0.005%, whereas in the usual operation of the cupola it is difficult even to maintain an adjustment of metallic component within a range of plus or minus 0.05%.

Similarly, whereas the temperature of the externally fired cupola can be finally adjusted to plus or minus 5° F. of that desired, in conventional cupola operations it is often difficult to adjust and maintain temperatures within even 50° F. of the preselected temperature.

These same comparative aspects exist with respect to the waste matter commonly discharged from a conventional cupola, as distinguished from that discharged from the externally fired cupola of the invention. Thus, viewing FIGURES 1 and 2, it is seen that the gaseous components in the externally fired operation amount to about one-tenth of those discharged as a result of conventional procedures. Hence, the carbon monoxide and carbon dioxide passing out of the stack are about one-half that passed into the atmosphere in cupola practices known to the art. Further, and as indicated, where the externally fired cupola is provided with an oxygen combustion supporting medium, exclusive of air, there is no discharge of nitrogen to the atmosphere, thus greatly reducing the overall gaseous emission from the stack.

Of equal significance is the fact that the externally fired cupola does not produce a substantial amount of fly ash and, hence, little, if any, of this waste product is discharged into the atmosphere, in sharp contrast to the situation existing in regard to conventional cupola practices. The reason is found in the charge of metal bearing oxides directly into the combustion zone, located externally of the cupola and positioned in the lower well of the column. In comparison, in conventional cupola operation any addition to the charge, as of a material such as silicon oxide, the latter is mixed therewith or deposited over the scrap, returns and pig constituting the major portion of the charge, with the tendency of the air blast to naturally fluidize or render air borne the smaller particles or impurities and force them out of the stack in substantial quantities.

A preferred embodiment of the invention is more particularly shown in FIGURES 3 and 4. Here a cupola is generally indicated at 1. For illustrative purposes it is provided with the usual type of wind box 5 which, of course, feeds into a series of tuyeres 7, only one of these being shown in FIGURE 1 for illustrative purposes, and two of these being shown in cross section in FIGURE 4. Each tuyere opens into the lower well of the furnace through a suitable aperture 8. A charging door 10 is provided in the upper portion of the cupola.

As indicated above, this invention contemplates the use of a fixed or semifixed bed 11. Such is disposed in the lower portion of the cupola and in the relative position shown in FIGURE 4, extending above both burner inlet and the series of tuyeres 7. The bed 11 is preferably made of suitable refractory material, and so placed as to be easily replaceable. As stated above, the relative height of the bed is not critical in the sense that the combustion of the fuel is largely dependent upon bed height. In the present instance, the nature of the alloy is determined by the combustion of the gases entering the cupola. In any event, the fixed bed is so located as to subject the charge to the most effective action of the combustion gases.

The bed 11 can be fashioned in any manner so long as it is perforate in the sense that a series of openings 13 are provided therein for complete distribution and diffusion of the combustion gases through the charge. In other words, instead of being more or less prefabricated as shown, the bed can simply be comprised of a loose refractory material, as refractory brick, loosely piled into the lower well portion to approximately the same height as that indicated by bed 11. At any rate, since the bed in either instance is not being consumed, as is the case with the ordinary coke bed used in conventional practices, a uniform permeability can be obtained across the cross section of the cupola, whereas the relatively impervious cone of material which forms in the center of the cupola under conventional conditions has an inhibitory effect in this regard. Such an impervious cone tends to deflect the burning back toward the outer wall with resultant impingement thereof on the refractories lining the shaft, thus contributing to substantial erosion or "cutout" of the refractories. Thus, in the fixed bed arrangement of my invention, an open bed is provided with the result that the gases of combustion tend to diffuse uniformly and travel upwardly without undue restriction.

The cupola is provided with the usual tap hole and spout 6. The slag can be removed from the well by either a front or rear opening.

The burner for the cupola is indicated at 14. As is usual in such cases, it may be imbedded, at least near its feed-in end in a suitable refractory material 18. The cupola itself is lined, as is common, with a suitable refractory material 17.

In the embodiment of the invention here shown an oxygen supply is fed to the burner through line 15, with a gas or air supply discharged to the burner through line 16. It will of course be understood that fuel gas itself can be utilized in place of the air as a carrier for the pulverized additives and fuel. The latter carries with it the pulverized mineral or nonmineral oxides, selectively chosen to produce the type of alloy desired. Also, this same gas or air supply line carries with it the combustible material for firing the cupola which, in the embodiment of the invention here being described, consists of pulverized coal.

Since the control of the carbon monoxide-carbon dioxide ratio in the burner is of importance in adjusting the carbon and mineral content of the ultimate product as well as the temperature, an additional and subsidiary line 20 is provided for supplementing the coal content in the combustion zone of the burner.

Actually, by addition of further carbon (here powdered coal) through line 20 the $CO:CO_2$ ratio may be controlled from 1 to 4 to 4 to 1. The temperatures in the secondary chamber of the burner and the exit temperature into the cupola may then be controlled in any desired range up to 3600° F. Adjustment of the production of carbon monoxide for reduction purposes is also thus enabled, to be varied to suit the requirement of the melt.

Further, the powdered coal fuel permits reducing, and within the combustion unit, such oxides as $SiO_2$, $MnO$, $P_2O_5$, etc., to their metallic forms and introducing them into the cupola under non-oxidizing conditions, again resulting in greater accuracy of control and lower cost.

Also, since most of the sulphur in cast iron emanates from the fuel used (coal or coke), the sulphur in the powdered coal can be removed as slag by the addition of CaO to the stream of coal and air or gas going into the burner and/or secondary chamber.

The maximum temperature (over 4000° F.) is a function of fineness of grind as well as the fuel-oxygen ratio and is not affected by rate of firing (pounds of coal/hour) over a wide range, limited on the high end by the fuel-air (oxygen) ratio and by mechanical mixing determined by the size of the cyclone on the lower end.

Therefore over a very wide range of heat input to the cupola, the tuyere temperature and $CO:CO_2$ ratio can be held constant. Conversely the temperature can be varied over a wide range.

The optimum $CO:CO_2$ ratio for a given cupola producing a given grade of iron can only be determined empirically and even then the reactivity of the coke in the bed in conventional operation can cause considerable variation.

At an operating temperature of about 3600° F. the maximum $CO_2$ will be about 84%. However, by the addition of coal to the secondary chamber of the burner, the $CO_2$ can be reduced (if desired) to about 40% and still maintain an exit temperature of 3600° F. Computation of these ranges must take into account that the combination of free oxygen from the breakdown of $CO_2$ at 4000° F. with carbon will be exothermic and the reduction of $CO_2$ by incandescent carbon to CO will be endothermic.

At any rate, it should here be noted that simply providing a specified number of heat units (B.t.u.'s) will not necessarily melt and refine the charge of metal. Such requires a specified amount of heat at a given temperature, which, of course, must be substantially above the melting point of the materials to be melted and refined. Therefore, a burner constructed to deliver a wide range of heat output at a given temperature and affixed to the cupola so that the heat generated by the combustion is caused to directly enter the cupola is a requisite of the instant invention. Here the ideal type of burner is of the cyclone type and designed to operate with coal, oil, gas or coke, singly or in combination. Its use permits employing coal (the combustible material disclosed in this specific embodiment of the invention) generally having a cost per unit of heat of about one-third of that of ordinary cupola coke.

In conjunction with the remaining controls to be described, this type of burner permits adjustment of the composition of the combustion gases entering the cupola to any desired characteristic, such as oxidizing to neutral to reducing. For example, with high carbon content of the material charged to the cupola and the requirement of a low carbon finished metal, the atmosphere entering the cupola can be controlled within specified oxidizing rates to burn off part of the carbon in the metal, and thus to obtain the desired, finished metal. On the other hand, in many operations, low carbon containing materials, such as scrap steel, are cheaper than either scrap cast iron or pig iron, and here the need is to increase the carbon content in which case a reducing atmosphere is desirable. This too can be controlled by controlling the rate of feed of the various oxide materials, the initial carbon content in the feed, and the supplemental carbon addition through line 20.

Similarly, with an efficient burner of the type mentioned, the same will convert the ash in the coal to a liquid slag. This will join the original slag in the well of the cupola instead of travelling with the other combustion gases as an air pollution element in the form of fly ash. This slag in the cyclone burner will protect the alloys which have been reduced from their oxides in the burner and will be delivered with the slag to the well of the cupola and mixed with the iron from the charge.

In the instant embodiment of the invention an air supply for the burner is used in conjunction with an auxiliary oxygen supply, although it is to be understood that the cupola may be operated with air as the only combustion supporting medium or as oxygen comprising that sole medium. In any event, as here disclosed, the gas or air supply carries with it the pulverized oxides which are necessary to reform the metal to its desired type of iron alloy. The air supply conduit also transmits to the burner the necessary combustible material, here in the form of pulverized coal.

Thus, air is pumped from the atmosphere through line 21 by pump 23 to conduit 25. The latter is intercepted by a metal or nonmetal oxide intake. These oxides may be in the form of manganese oxide, silicon oxide, phosphorus oxide, calcium oxide, or the oxide of any other metal commonly used as the basis for reformation of the melt. They are discharged in pulverized form to a suitable hopper 28 and from there feed into a metering valve 30 capable of adjusting the amounts thereof fed into line 32, as with conduit 25 (the air supply conduit) each leading to a suitable mixer 34.

These oxides are carried by the air or gas stream through line 35 to an air-oxygen ratio controller 40. This mechanism is of a known type and interconnects with the air-oxide mixture through elements 41 and 42 on the one side; on its other side the air-oxygen ratio controller is interconnected with the burner oxygen supply line 46 as through elements 43 and 44. The operation of a controller such as this is well known to the art; it being sufficient to here state that its purpose, as indicated, is to vary the ratio of oxygen to air, all under the control of the operator, and thus to control the combustion rate, rate of oxidation, of reduction, etc.

The combustible material, here coal, is similarly supplied in pulverized form. The raw coal is first fed to a suitable hopper and dryer 50. From the latter it is discharged to a coal pulverizer 52 and after being reduced to pulverized form is carried by a screw conveyor 55 to a pulverized coal hopper 58. The pulverized coal similarly passes through line 60 to a metering valve 63 by which, of course, its quantity and rate of delivery can be continuously controlled.

Emanating from metering valve 63, the pulverized coal is charged to a coal-gas mixer. The pulverized materials in the gas are also conveyed through line 35 into this mixer 64. Thus, the material which is charged through line 66 and thence through line 16 to the burner consists of air or gas, the pulverized oxides in predetermined quantities, and the pulverized coal likewise in predetermined amounts. Obviously the coal-gas or air mixture is of a highly combustible nature and even more so when predetermined amounts of oxygen are fed to the burner through line 46.

Actually, and utilizing the cyclone type of burner, combustion takes place in the combustion chamber 47 of the burner. The products of combustion are fed directly into the secondary portion 48 of the cyclone burner. These products of combustion are adjustable as to temperature and proportion in the secondary part of the burner and then enter directly into the lower well portion of the cupola, as illustrated in FIGURE 4.

It will be further noted that the burner-combustion chamber arrangement is angled to the horizontal and downwardly toward the lower well portion of the cupola. This angle is represented at A, FIGURE 3. The angularity is of significance—at the relatively high temperatures here involved certain amounts of slag may be formed in the burner combustion chamber as well as alloying metals. It is, of course, desired that the chamber be free of any such restrictive deposits and, accordingly, the burner is angled in the manner indicated which may be that any slag, also reduced metallics so formed, join that produced by the melting operation, thus to be discharged therewith through slag knotch 9.

In the preferred embodiment of the invention this angle of inclination of the burner is about 5°, but may vary from 3° to 7°. Such angularity is of further functional advantage in that the open flames of combustion are directed downwardly toward the bottom of the well, effectuating more complete diffusion throughout the well portion of the cupola and, hence, more complete and even diffusion through the charge resting upon the permanent or semipermanent bed 11.

In the operation just described, only one burner is utilized. However, for different purposes or different metallurgical operations more than one may be required, in which case branch line 70 may be taken from line 66 containing the coal-oxide-air mixture, to other burners mounted in the base of the cupola.

Reference has been made to this invention as lending itself to simplifying the air pollution problem involved in any cupola operation. In view of the low cost of the fuel here contemplated it becomes economically practical to use industrial oxygen in place of air. Air contains about 21.0% oxygen, with the nitrogen serving no useful purpose and requiring heat. With the elimination of nitrogen by employing industrially pure oxygen, the amount of heat lost in the waste gases are reduced, at least theoretically, to over 75%. The air pollution problem is one which exists in direct proportion to the volume of discharged gases to be cleaned, bearing in mind also that the temperature of such gases relates to the problem. Since the instant invention permits, in the manner named, reduction of the volume of waste gases by about 75%, and permits as well a substantial reduction in the temperature of these waste products, the problem of further controlling air pollution is reduced in proportional magnitude.

In the instant case, and referring to FIGURE 4, the cupola is provided with a collector ring 70, the waste gases collected thereby being forced through a wet scrubber 73 and thence through a carbon monoxide-carbon dioxide analyzer cell 76. The scrubber removes the solids from the waste gases and reduces the temperature thereof to from about 150° F. to about 175° F. maximum, thus to protect the $CO$-$CO_2$ cell and thus to also render a more accurate read-out.

Sludge from the scrubber 73 is discharged to waste through line 75. If desired, a bag collector or precipitator 80 may be added to further reduce discharge of remaining quantities of solid particles in the discharged gases.

The $CO$-$CO_2$ analyzer cell is essential in this regard—carbon control of the finished metal is based upon accurate analysis of the $CO$-$CO_2$ ratio in the effluent gas from the cupola. As stated, with the use of oxygen in place of primary air the volume of gas evolved will be reduced from 80 to 90% on this basis, the collection of the entire effluent gas becoming correspondingly easier, or its emission into the atmosphere more readily suppressed and controlled.

In other words, where the volume of effluent gas from the cupola is reduced by 80 to 90%, and the temperature reduced to near ambient, the remaining problem of collecting or entrapping the solids still present can be achieved with a wide variety of commercially available equipment, and far more effectively. In this regard, even if the use of electrostatic precipitators becomes mandatory, because of the substantially reduced amount of solids present, the cost is minimal, at least on a relative basis and in comparison with the pollution problem raised by conventional cupola practices.

With regard to the method of addition of mineral and other oxides for the purpose of metal reformation my invention exhibits additional advantages: the abiilty to add low cost materials through the burner permits the reduction of some undesirable elements and/or the addition of desirable elements. For example, about one-half the sulphur in the finished cast iron comes from the fuel being burnt in the cupola. By adding calcium, either as powdered calcium-oxide or calcium-carbonate, a reaction will take place in the burner between the sulfur in the fuel and the calcium, resulting in a calcium-sulfide component being added to the slag instead of to the metal or the gases as sulfuric acid, which would adversely affect the life of the air pollution control system.

Under conditions of combustion with a surplus of carbon, finely divided oxides of metals, such as silicon, manganese, chrome, etc., can be fed with the fuel and reduced to their metallic forms. They travel with the slag from the ash in the coal or with slag introduced in the case of nonash containing fuels, into the well of the cupola as alloying elements.

Similarly, materials to control slag viscosity and characteristics, such as fluorspar can be introduced through the burner and will give immediate results rather than at present, where they are charged at the top, with a time lag of one-half hour or more before they become effective.

Coal and other fuels can be burnt to generate temperatures in excess of 4500° F., but even at temperatures in excess of 2500° F., both water and carbon dioxide gas will break down to about 75% carbon dioxide, the balance being carbon monoxide and oxygen. If carbon is fed into the gas stream at these temperatures, a further reduction will take place (with the loss of heat) to produce more carbon monoxide from the reaction $CO_2+C=2CO$, with the simple combustion of carbon and oxygen rendering some heat and CO. It is therefore possible to produce a gas having a CO to $CO_2$ ratio of from 1:4 to 4:1, which enables, with the proper material charged into the coupla, the production of carbon percentages in the finished iron of from about .99% to 6.0%.

A further advantage of the controlled atmosphere within the cuplo, a resultant upon practice of the instant invention, is the capability of smelting ores in the cupola, together with such other materials as may needed to produce, at the site, an iron product of the required characteristics. Iron ore, for example, is reduced by CO gas, as well as by hydrogen gas. However, under the conditions outlined herein, the CO gas is more effective and its percentage in the gaseous mixture can be more readily controlled.

It is theorized that at 3000° F. temperature the gas entering the cupola will have as high as 75% CO, which would produce from the ore an iron of about 3.5 carbon, 2.5 silicon or in effect, the full equivalent of pig iron or cast iron scrap. Iron ore per unit of contained ore in many areas is cheaper than steel scrap and much cheaper than cast iron scrap or pig iron. Thus, the cost of the extra fuel to generate additional CO gas in the amount indicated, would, in most areas, be less than the price differential between native ore and the other metals utilized. It should be understood that the media to support combustion can be air or oxygen or a combination thereof. It should also be understood that the fuel can be fuel gas, oil, coal or coke, as well as combinations thereof, for efficiency, safety and greater effectiveness, the solid fuels can be conveyed with fuel gas or oil. They can also be conveyed with air and in some instances with oxygen.

Other advantages and objectives of the invention should be apparent from consideration of the foregoing description thereof; however, the invention is not to be deemed limited in any respect, except as required by the several limitations of the claims appended hereto.

I claim:
1. In a cupola furnace having a lower well, a heating and reducing zone in said furnace, a fixed, perforate bed in said zone above said lower well to support a charge of metal to be reformed, a burner exteriorly of said cupola having a combustion chamber exteriorly of said cupola, means to discharge the products of combustion from said chamber into said lower well below said bed, means to feed a combustion supporting medium to said burner in metered amounts, and means to discharge into said combustion supporting medium prior to entry into said burner metered amounts of pulverized, oxide metal reforming agents and metered amounts of a particulated combustible material, whereby said charge may be reformed without coke bed oxidation.

2. The invention as defined in claim 1 wherein said combustion supporting medium comprises an air-oxygen mixture and means are provided to vary the ratio of air to oxygen prior to entry into said burner.

3. The invention as described in claim 1 wherein said burner is provided with primary and secondary combustion chambers and said secondary chamber has an inlet for the admission of supplemental carbon, whereby the carbon monoxide to carbon dioxide ratio may be varied.

4. The invention as defined in claim 3 wherein said burner is disposed downwardly with respect to the horizontal at an angle of from 3° to 5° thereto, thereby to facilitate the flow of slag therefrom.

5. The invention as defined in claim 4 wherein means are provided to thoroughly mix said particulated combustible material and said pulverized, oxide reforming agents in said combustion supporting medium prior to admission to said burner.

6. In a method of operating a cupola furnace, supporting a charge of partially refined metal to be melted upon a fixed and relatively immovable bed within the melting zone of said cupola, supplying a combustion supporting medium to a combustion zone externally of said melting zone, continuously feeding metered amounts of metal reforming oxides and metered amounts of a particulated combustible substance to said medium prior to entry of said medium into said combustion zone, combusting said substance in said combustion zone, feeding the products of combustion into said furnace below said fixed bed, and controlling the rate of feed of said combustion supporting medium, said metal reforming oxides and said particulated combustible substance during combustion in said combustion zone.

7. The method as defined in claim 6 wherein said combustion zone comprises a primary combustion area and a secondary combustion area externally of said cupola furnace, and controlled amounts of additional combustible substance are fed into said secondary combustion area to control the ratio of carbon monoxide to carbon dioxide produced therein.

8. The method as defined in claim 6 wherein said charge consists of scrap, flux and returns, said reforming oxides are in pulverized form and selected from the group consisting of CaO, $SiO_2$, $MnO_2$ and $P_2O_5$, and said particulated combustible substance is pulverized coal.

9. The method as defined in claim 6 wherein said combustion zone comprises a primary combustion area and a secondary combustion area externally of said cupola furnace, controlled amounts of additional combustible substances are fed into said secondary combustion area to control the ratio of carbon monoxide to carbon dioxide produced therein, said charge consists of scrap metal, iron ore pellets and flux, and said reforming oxides are in pulverized form and selected from the group consisting of $CaO$, $SiO_2$, $MnO_2$ and $P_2O_5$, and said particulated combustible substance is pulverized coal.

10. The method as defined in claim 9 wherein said carbon monoxide to carbon dioxide ratio in said furnace is controlled within a range of from 1:4 to 4:1.

References Cited

UNITED STATES PATENTS

| | | | |
|---|---|---|---|
| 1,349,598 | 8/1920 | Basset | 75—42 |
| 1,507,214 | 9/1924 | Somers et al. | 75—41 |
| 1,876,260 | 9/1932 | Osborn | 266—25 X |
| 1,831,254 | 11/1931 | Meloche | 266—25 X |
| 1,977,428 | 10/1934 | Cromwell | 266—28 X |
| 2,544,697 | 3/1951 | Lewis | 75—41 |
| 2,784,037 | 3/1957 | Rexroth | 266—28 X |
| 3,338,707 | 8/1967 | Carli et al. | 266—25 X |
| 3,373,981 | 3/1968 | Taubmann et al. | 266—25 X |

FOREIGN PATENTS 998,213  7/1965  Great Britain.

L. DEWAYNE RUTLEDGE, *Primary Examiner.*

H. W. TARRING, *Assistant Examiner.*

U.S. Cl. X.R.

266—25, 28; 75—41